F. Z. HANSCOM.
ANTERIOR TOOTH AND BACKING.
APPLICATION FILED DEC. 3, 1917.

1,335,734. Patented Apr. 6, 1920.

Witnesses:
Irene Forrest
Lee J. Pitner

Inventor:
Frank Z. Hanscom,
By Glenn S. Noble
Att'y.

UNITED STATES PATENT OFFICE.

FRANK Z. HANSCOM, OF ELMHURST, ILLINOIS.

ANTERIOR TOOTH AND BACKING.

1,335,734.  Specification of Letters Patent.  Patented Apr. 6, 1920.

Application filed December 3, 1917. Serial No. 205,200½.

*To all whom it may concern:*

Be it known that I, FRANK Z. HANSCOM, a citizen of the United States, residing at Elmhurst, in the county of Dupage, and State of Illinois, have invented certain new and useful Improvements in Anterior Teeth and Backings, of which the following is a specification.

This invention relates more particularly to the form or construction of anterior teeth and to the means for supporting the same, and also to the method or arrangement whereby the backings may be securely united, as in making bridge-work. Artificial teeth of this character, such as are commonly provided, are nearly always formed with a view of their being ground off at the cutting edge in order to properly fit the backings thereto, and it always requires a comparatively large amount of special grinding and fitting in order to fit the backings and properly solder or secure the backings together. The soldering process and any subsequent grinding or finishing of their cutting edges is apt to bruise, check or crack the porcelain facings or teeth proper.

Among the objects of my invention are; to provide anterior teeth made of porcelain or other suitable material which are so constructed that they will require comparatively little grinding, but which may be readily ground in order to fit them to standard sized backings; to provide suitable backings which may be made in standard sizes by stamping from tough resisting sheet metal, or in other suitable manner; to provide means for readily securing the teeth or facings to the backings, and in general to provide an improved construction of this character such as will be more fully described hereinafter.

In the accompanying drawings illustrating my invention:

Figure 1:
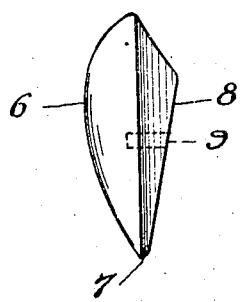
Figure 1 is a side view of an anterior tooth or facing.
Figure 2:
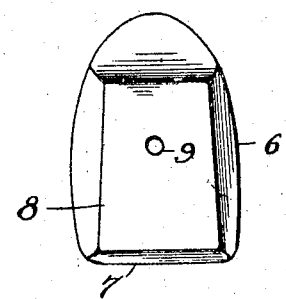
Fig. 2 is a rear view of the same.
Figure 3:
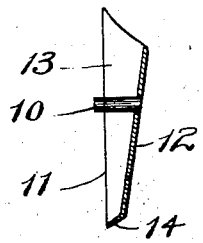
Fig. 3 is a vertical sectional view of the backing.
Figure 4:
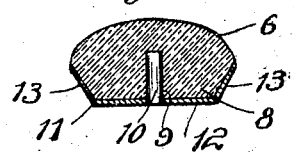
Fig. 4 is a horizontal sectional view showing the tooth in position in the backing; and, Fig. 5 is a plan view illustrating the method of soldering or securing together of the backings.

In accordance with my invention, I provide a tooth or facing 6, which represents any of the anterior teeth, but which for convenience in description may be considered as an upper tooth. This tooth is preferably made relatively thick through its upper portion and converges toward the lower or cutting edge 7. The back or engaging portion 8 of the tooth is substantially rectangular and flat on its rear surface with its sides and ends tapered or beveled toward the sides and ends of the tooth as clearly indicated in Figs. 1 and 2. The back is provided with a hole 9 for receiving a pin 10, which pin is secured to the backing 11. The backing 11 has a flat portion 12 corresponding with the flat surface on the back of the tooth and is provided with diverging sides 13 for engagement with the sides of the rear portion of the tooth and a diverging end 14 for engagement with beveled lower portion or cutting edge of the tooth. The backing is preferably left open at its upper end so that the upper end of the tooth and the adjacent edges of the backing may be ground to any extent desired.

Figure 5:
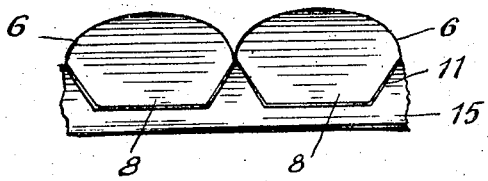

The teeth or facings 6 are preferably made in standard sizes to meet the ordinary requirements of the dental profession, and the backings are made by stamping, or otherwise in standard sizes, to correspond with the different sized facings. It is well understood that it is exceedingly difficult, if not impossible, to make porcelain teeth or facings which are absolutely of uniform size, even if made from the same mold, and with the forms of teeth heretofore proposed, it has been exceedingly difficult, if not impossible to readily fit the teeth into standard sized backings. With my improved construction it will be seen that the engaging surfaces are all substantially flat and, if there is a slight variation in these surfaces, they may be readily ground so as to fit the teeth or facings to the backings. It will be particularly noted that when the teeth are fitted in the backings, the lower side 14 of the backing comes over the cutting edge of the tooth so as to protect such cutting edge, and it is the intention that the teeth will then be set so that no grinding is necessary at this end of the tooth, but all of the grinding may be done at the opposite end of the tooth. This arrangement will prevent the liability of cracking or checking the cutting edges of the teeth by grinding.

and will also make a more substantial cutting edge. When my improved teeth with their backings are to be connected together as in making a bridge, it will be noted that a substantially triangular space is left between the opposed sides 13 of the backings of two adjacent teeth. This space is clearly shown in Fig. 5, which also indicates the solder 15, which is flowed into this space and over the backings in order to unite the teeth. This comparatively large triangular space permits a substantial amount of solder to enter in between the backings and greatly strengthens the support or bridge, as the solder assumes the general form of a bar with a plurality of triangular ridges on the outer side thereof, which ridges add greatly to the strength of the bar, as well as serving to hold the backings securely in position. In ordinary practice my improved facings with the backings thereon will be fitted to the model, the facings then removed and the backings properly invested, and soldered together. The facings will then be pressed into position in the backings and will be held by the pins 10 and suitable cement which may be used for cementing them into the backings. By means of this arrangement it will be seen that the teeth are not subjected to the heat which has a tendency to crack the same.

From the above description it will be readily seen that I provide a substantial form of teeth and backings which may be readily made in large numbers for commercial purposes, and which may be utilized by the practising dentists with a comparatively small amount of work.

Having thus described my invention, what I claim and desire to secure by Letters Patent is:

An anterior tooth having a plane lingual surface, and having plane beveled side surfaces extending from the lingual surfaces to the labial surface and meeting the labial surface at the sides of the tooth, said side surfaces diminishing in width from the cervical end toward the cutting edge of the tooth.

FRANK Z. HANSCOM.